United States Patent
Mueller et al.

(10) Patent No.: US 7,534,303 B2
(45) Date of Patent: May 19, 2009

(54) LIQUID ABSORPTION BY METAL-ORGANIC FRAMEWORKS

(75) Inventors: Ulrich Mueller, Neustadt (DE); Michael Hesse, Worms (DE); Hermann Puetter, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 500 days.

(21) Appl. No.: 11/276,425

(22) Filed: Feb. 28, 2006

(65) Prior Publication Data

US 2006/0210458 A1  Sep. 21, 2006

(30) Foreign Application Priority Data

Mar. 16, 2005  (DE) .................. 10 2005 012 087

(51) Int. Cl.
*B01D 15/00* (2006.01)
*C02F 1/00* (2006.01)

(52) U.S. Cl. ......................................... 134/7

(58) Field of Classification Search ............ 210/660, 210/690; 134/6, 7
See application file for complete search history.

(56) References Cited

U.S. PATENT DOCUMENTS

| 4,011,098 | A | * | 3/1977 | Seidenberger | 134/6 |
| 4,578,119 | A | * | 3/1986 | Marcus et al. | 134/4 |
| 5,648,508 | A | * | 7/1997 | Yaghi | 556/9 |
| 2004/0097724 | A1 | | 5/2004 | Muller et al. | |

FOREIGN PATENT DOCUMENTS

| EP | 0 790 253 A2 | 8/1997 |
| FR | 2 708 002 | 1/1995 |
| GB | 1 552 602 | 9/1979 |
| WO | WO 82/04271 | 12/1982 |
| WO | WO 02/070526 A1 | 9/2002 |
| WO | WO 2004/101575 A2 | 11/2004 |

* cited by examiner

Primary Examiner—Frank M Lawrence
(74) Attorney, Agent, or Firm—Oblon, Spivak, McClelland, Maier & Neustadt, P.C.

(57) ABSTRACT

The present invention relates to a method for the absorption of liquids, which comprises the step of bringing the liquid into contact with at least one sorbent comprising a porous metal-organic framework, the framework taking up the liquid and comprising at least one at least bidentate organic compound having a coordinate bond to at least one metal ion.

9 Claims, No Drawings

LIQUID ABSORPTION BY METAL-ORGANIC FRAMEWORKS

The present invention relates to methods for the absorption of liquids using a porous metal-organic framework.

Solids are frequently required for binding liquids in or to them in order to ensure that these liquids do not spread or come into contact with other liquids or solids or to make the abovementioned liquids capable of being handled.

Cases where liquids are accidentally spilled, as may occur in the laboratory, may be mentioned here by way of example. The dropping of containers, such as glass bottles, also leads to the necessity of binding liquid on table tops or the floor to a solid. The liquid is frequently an inorganic or organic solvent.

A further frequent case where liquids have to be taken up in or on solids in order to avoid contamination of the floor or the air occurs in traffic accidents. Here, emerging liquids, such as gasoline, motor oil, gear oil and the like, have to be appropriately treated.

Furthermore, taking up liquids, such as disinfectant or odoriferous substances, in solids is advantageous since the abovementioned handling properties are facilitated by the solid, and the liquid can be released via the gas phase to the environment, for example the room air, by the solid in a controlled manner.

Solids for absorption are known in the prior art. These include, for example, ion exchangers and zeolites. A customary absorbent for liquids is available under the name Chemizorb® from Merck.

A disadvantage of the use of solids in methods for absorption of liquids is their limited absorptivity and swelling properties when taking up liquids.

The object of the present invention is to provide an improved method using a solid absorbent, which, at least partly, has better properties compared with the prior art. The object is achieved by a method for the absorption of liquids which comprises the step bringing the liquid into contact with at least one sorbent comprising a porous metal-organic framework (MOF), the framework taking up the liquid and comprising at least one at least bidentate organic compound having a coordinate bond to at least one metal ion.

It has been found that the porous metal-organic framework according to the present invention have advantageous properties in the absorption of liquids.

The liquid is advantageously liquid waste as described above. Furthermore, the liquid is preferably a disinfectant, an odoriferous substance, an inorganic or organic solvent, fuel, in particular gasoline or diesel, hydraulic, radiator or brake fluid or an oil, in particular machine oil.

Particularly preferably, the liquid to be absorbed comprises an optionally halogenated aliphatic or aromatic, cyclic or acyclic hydrocarbon or mixtures thereof.

Particularly preferably, the liquid comprises acetone, acetonitrile, aniline, anisole, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water or mixtures thereof.

As explained in more detail further below, the MOF may be present in powder form or as a molding. It can be brought into contact by simple covering of, for example, leaked or spilled liquid. Expediently, it is poured onto the corresponding pool.

Alternatively, the MOF can be stored in an open container, in particular if controlled absorption is to be effected. In this case, it can be brought into contact by simply pouring the liquid onto the MOF.

It is just as conceivable for the MOF to be present in a container which is closed with respect to the MOF but which is permeable for the liquid to be absorbed. Said container may have pores or orifices of corresponding dimensions for this purpose.

Numerous further examples as to how contact can be established, in each case depending on the intended application, are known to the person skilled in the art.

A further aspect of the present invention is that, after the absorption of the liquid, the MOF may have the same volume as before the absorption. Consequently, in particular no swelling occurs as a result of the absorption of the liquid. This is an advantage in particular compared with ion exchangers.

A further aspect relates in particular to MOF in which at least one metal ion is Cu. Here, saturation of the MOF by the liquid can advantageously be detected through a color change.

The porous metal-organic framework comprises at least one at least bidentate organic compound having a coordinate bond to at least one metal ion. This metal-organic framework (MOF) is described, for example, in U.S. Pat. No. 5,648,508, EP-A-0 790 253, M. O-Keeffe et al., J. Sol. State Chem., 152 (2000), pages 3 to 20, H. Li et al., Nature 402, (1999), page 276, M. Eddaoudi et al., Topics in Catalysis 9, (1999), pages 105 to 111, B. Chen et al., Science 291, (2001), pages 1021 to 1023, and DE-A-101 11 230.

The MOFs according to the present invention comprise pores, in particular micropores and/or mesopores. Micropores are defined as those having a diameter of 2 nm or less and mesopores are defined by a diameter in the range from 2 to 50 nm, in each case according to the definition as stated in Pure Applied Chem. 45, page 71, in particular on page 79 (1976). The presence of micropores and/or mesopores can be checked with the aid of sorption measurements, these measurements determining the absorptivity of the MOF for nitrogen at 77 Kelvin according to DIN 66131 and/or DIN 66134.

The specific surface area, calculated using the Langmuir model according to DIN 66135 (DIN 66131, 66134) for an MOF in powder form, is more than 5 m$^2$/g, more preferably over 10 m$^2$/g, more preferably more than 50 m$^2$/g, even more preferably more than 500 m$^2$/g, even more preferably more than 1000 m$^2$/g and particularly preferably more than 1500 m$^2$/g.

MOF moldings may have a lower specific surface area; preferably, however, more than 10 m$^2$/g, more preferably more than 50 m$^2$/g, even more preferably more than 500 m$^2$/g.

The metal components in the framework according to the present invention is preferably selected from the groups Ia, IIa, IIIa, IVa to VIIIa and Ib to VIb. Mg, Ca, Sr, Ba, Sc, Y, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi are particularly preferred. Zn, Cu, Ni, Pd, Pt, Ru, Rh and Co are more preferred. With regard to the ions of these elements, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$ may be mentioned in particular.

The term "at least bidentate organic compound" refers to an organic compound which comprises at least one functional group which is capable of forming at least two bonds, preferably two coordinate bonds, to a given metal ion and/or one coordinate bond to two or more, preferably two, metal atoms.

In particular, the following functional groups may be mentioned by way of example as functional groups via which said coordinate bonds can be formed: —$CO_2H$, —$CS_2H$, —$NO_2$, —$B(OH)_2$, —$SO_3H$, —$Si(OH)_3$, —$Ge(OH)_3$, —$Sn(OH)_3$, —$Si(SH)_4$, —$Ge(SH)_4$, —$Sn(SH)_3$, —$PO_3H$, —$AsO_3H$, —$AsO_4H$, —$P(SH)_3$, —$As(SH)_3$, —$CH(RSH)_2$, —$C(RSH)_3$, —$CH(RNH_2)_2$, —$(RNH_2)_3$, —$CH(ROH)_2$, —$C(ROH)_3$, —$CH(RCN)_2$, —$C(RCN)_3$, where R is, for example, preferably an alkylene group having 1, 2, 3, 4 or 5 carbon atoms, such as, for example, a methylene, ethylene, n-propylene, isopropylene, n-butylene, isobutylene, tert-butylene or n-pentylene group, or an aryl group comprising one or two aromatic nuclei, such as, for example, 2 $C_6$ rings which, if appropriate, may be condensed and, independently of one another, may be suitably substituted by at least one substituent in each case, and/or, independently of one another, may comprise in each case at least one hetero atom, such as, for example, N, O and/or S. According to likewise preferred embodiments, functional groups in which the abovementioned radical R is not present may be mentioned. Inter alia, —$CH(SH)_2$, —$C(SH)_3$, —$CH(NH_2)_2$, —$C(NH_2)_3$, —$CH(OH)_2$, —$C(OH)_3$, —$CH(CN)_2$ or —$C(CN)_3$ may be mentioned in this context.

The at least two functional groups can in principle be bonded to any suitable organic compound, provided that it is ensured that the organic compound having these functional groups is capable of forming the coordinate bond and of producing the framework.

Preferably, the organic compounds which comprise the at least two functional groups are derived from a saturated or unsaturated aliphatic compound or an aromatic compound or a compound which is both aliphatic and aromatic.

The aliphatic compound or the aliphatic moiety of the compound which is both aliphatic and aromatic may be linear and/or branched and/or cyclic, a plurality of cycles per compound also being possible. More preferably, the aliphatic compound or the aliphatic moiety of the compound which is both aliphatic and aromatic comprises 1 to 15, more preferably 1 to 14, more preferably 1 to 13, more preferably 1 to 12, more preferably 1 to 11 and particularly preferably 1 to 10, carbon atoms, such as, for example, 1, 2, 3, 4, 5, 6, 7, 8, 9 or 10 carbon atoms. Inter alia, methane, adamantane, acetylene, ethylene or butadiene are particularly preferred here.

The aromatic compound or the aromatic moiety of the compound which is both aromatic and aliphatic may have one or more nuclei, such as, for example, two, three, four or five nuclei, it being possible for the nuclei to be present separated from one another and/or for at least two nuclei to be present in fused form. Particularly preferably, the aromatic compound or the aromatic moiety of the compound which is both aliphatic and aromatic has one, two or three nuclei, one or two nuclei being particularly preferred. Independently of one another, it is furthermore possible for each nuclei of said compound to comprise at least one hetero atom, such as, for example, N, O, S, B, P, Si or Al, preferably N, O and/or S. More preferably, the aromatic compound or the aromatic moiety of the compound which is both aromatic and aliphatic comprises one or two $C_6$ nuclei, the two nuclei being present either separated from one another or in fused form. In particular, benzene, naphthalene and/or biphenyl and/or bipyridyl and/or pyridyl may be mentioned as aromatic compounds.

Inter alia, trans-muconic acid or fumaric acid or phenylenebisacrylic acid may be mentioned by way of example.

In the context of the present invention, dicarboxylic acids, such as, for example, oxalic acid, succinic acid, tartaric acid, 1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenyl ethane-3,3'-dicarboxylic acid, quinoline-3,4-dicarboxylic acid, 7-chloro-4-hydroxyquinoline-2,8-dicarboxylic acid, diimidodicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidene-3,3'-dicarboxylic acid, 1,4-bis(phenylamino)benzene-2,5-dicarboxylic acid, 1,1'-dinaphthyl-5,5'-dicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazoline-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, O-hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diaminodiphenyl ether diimidodicarboxylic acid, 4,4'-diaminodiphenylmethanediimidodicarboxylic acid, 4,4'-diaminodiphenyl sulfone diimidodicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4''-dicarboxylic acid, diphenyl ether 4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatricontanedicarboxylic acid, tetradecanedicarboxylic acid, 1,7-heptadicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluoroubin-4,11-dicarboxylic acid, 7-chloro-3-mnethylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid or 5-ethyl-2,3-pyridinedicarboxylic acid, tricarboxylic acids, such as, for example, 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphon-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurinetricarboxylic acid, or tetracarboxylic acids, such as, for example, 1,1-dioxoperylo[1,12-BCD]thiophene-3,4,9,10-tetracarboxylic acid, perylene-tetracarboxylic acids, such as perylene-3,4,9,10-tetracarboxylic acid or perylene-1,12-sulfonyl-3,4,9,10-tetracarboxylic acid, butanetetracarboxylic acids, such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids, such as cyclopentane-1,2,3,4-tetracarboxylic acid, may be mentioned by way of example.

If appropriate, at least monosubstituted mono-, di-, tri- or tetranuclear di-, tri- or tetracarboxylic acids or those having a larger number of nuclei are very particularly preferably used, it being possible for each of the nuclei to comprise at least one hetero atom, and for two or more nuclei to comprise identical or different hetero atoms. For example, mononuclear dicarboxylic acids, mononuclear tricarboxylic acids, mononuclear tetracarboxylic acids, dinuclear dicarboxylic acids, dinuclear tricarboxylic acids, dinuclear tetracarboxylic acids, trinuclear dicarboxylic acids, trinuclear tricarboxylic acids, trinuclear tetracarboxylic acids, tetranuclear dicarboxylic acids, tetranuclear tricarboxylic acids and/or tetranuclear tetracarboxylic acids are preferred. Suitable hetero atoms are, for example, N, O, S, B, P, Si and Al, preferred hetero atoms here are N, S and/or O. Inter alia, —OH, a nitro group, an amino group or an alkyl or alkoxy group may be mentioned as a suitable substituent in this context.

Acetylenedicarboxylic acid (ADC), benzenedicarboxylic acids, naphthalenedicarboxylic acids, biphenyldicarboxylic acids, such as, for example, 4,4'-biphenyldicarboxylic acid (BPDC), bipyridinedicarboxylic acids, such as, for example, 2,2'-bipyridinedicarboxylic acids, such as, for example, 2,2'-bipyridine-5,5'-dicarboxylic acid, benzenetricarboxylic acids, such as, for example, 1,2,3-benzenetricarboxylic acids or 1,3,5-benzenetricarboxylic acid (BTC), adamantanetetracarboxylic acid (ATC), adamantanedibenzoate (ADB), benzenetribenzoate (BTB), methanetetrabenzoate (MTB), adamantanetetrabenzoate or dihydroxyterephthalic acids, such as, for example, 2,5-dihydroxyterephthalic acid (DHBDC), are particularly preferably used as at least bidentate organic compounds.

Inter alia, isophthalic acid, terephthalic acid, 2,5-dihydroxyterephthalic acid, 1,2,3-benzenetricarboxylic acid, 1,3,5-benzenetricarboxylic acid, 2,2'-bipyridine-5,5'-dicarboxylic acid or 2,6-naphthalenedicarboxylic acid are very particularly preferably used.

In addition to these at least bidentate organic compounds, the MOF may also comprise one or more monodentate ligands.

Suitable solvents for the preparation of the MOF are, inter alia, ethanol, dimethylformamide, toluene, methanol, chlorobenzene, diethylformamide, dimethyl sulfoxide, water, hydrogen peroxide, methylamine, sodium hydroxide solution, N-methylpyrrolidone ether, acetonitrile, benzylchloride, triethylamine, ethylene glycol and mixtures thereof. Further metal ions, at least bidentate organic compounds and solvents for the preparation of MOF are described, inter alia, in U.S. Pat. No. 5,648,508 or DE-A 101 11 230.

The pore size of the MOF can be controlled by the choice of the suitable ligand and/or of the at least bidentate organic compound. In general, it is true that the larger the organic compound, the larger the pore size. The pore size is preferably from 0.2 nm to 30 nm; particularly preferably, the pore size is in the range from 0.3 nm to 3 nm, based on the crystalline material.

In an MOF molding, however, even larger pores occur, the size distribution of which may vary. Preferably, however, more than 50% of the total pore volume, in particular more than 75%, is formed by pores having a pore diameter of up to 1000 nm. Preferably, however, a major part of the pore volume is formed by pores from two diameter ranges. It is therefore more preferable if more than 25% of the total pore volume, in particular more than 50% of the total pore volume, is formed by pores which are in a diameter range from 100 nm to 800 nm and if more than 15% of the total pore volume, in particular more than 25% of the total pore volume, is formed by pores which are in a diameter range of up to 10 nm. The pore distribution can be determined by means of mercury porosimetry.

Examples of MOFs are shown below. In addition to the characterization of the MOF, the metal and the at least bidentate ligand, the solvent and the cell parameters (angles α, β and γ and the distances a, b and c in Å) are furthermore stated. The latter were determined by X-ray diffraction.

| MOF-n | Ingredients molar ratio M + L | Solvents | α | β | γ | a | b | c | Space group |
|---|---|---|---|---|---|---|---|---|---|
| MOF-0 | Zn(NO$_3$)$_2$·6H$_2$O H$_3$(BTC) | Ethanol | 90 | 90 | 120 | 16.711 | 16.711 | 14.189 | P6(3)/Mcm |
| MOF-2 | Zn(NO$_3$)$_2$·6H$_2$O (0.246 mmol) H$_2$(BDC) (0.241 mmol) | DMF Toluene | 90 | 102.8 | 90 | 6718 | 15.49 | 12.43 | P2(1)/n |
| MOF-3 | Zn(NO$_3$)$_2$·6H$_2$O (1.89 mmol) H$_2$(BDC) (1.93 mmol) | DMF MeOH | 99.72 | 111.11 | 108.4 | 9.726 | 9.911 | 10.45 | P-1 |
| MOF-4 | Zn(NO$_3$)$_2$·6H$_2$O (1.00 mmol) H$_3$(BTC) (0.5 mmol) | Ethanol | 90 | 90 | 90 | 14.728 | 14.728 | 14.728 | P2(1)3 |
| MOF-5 | Zn(NO$_3$)$_2$·6H$_2$O (2.22 mmol) H$_2$(BDC) (2.17 mmol) | DMF Chlorobenzene | 90 | 90 | 90 | 25.669 | 25.669 | 25.669 | Fm-3m |
| MOF-38 | Zn(NO$_3$)$_2$·6H$_2$O (0.27 mmol) H$_3$(BTC) (0.15 mmol) | DMF Chlorobenzene | 90 | 90 | 90 | 20.657 | 20.657 | 17.84 | I4cm |
| MOF-31 Zn.(ADC)$_2$ | Zn(NO$_3$)$_2$·6H$_2$O 0.4 mmol H$_2$(ADC) 0.8 mmol | Ethanol | 90 | 90 | 90 | 10.821 | 10.821 | 10.821 | Pn(-3)m |
| MOF-12 Zn$_2$(ATC) | Zn(NO$_3$)$_2$·6H$_2$O 0.3 mmol H$_4$(ATC) 0.15 mmol | Ethanol | 90 | 90 | 90 | 15.745 | 16.907 | 18.167 | Pbca |
| MOF-20 Z$_n$ NDC | Zn(NO$_3$)$_2$·6H$_2$O 0.37 mmol H$_2$NDC 0.36 mmol | DMF Chlorobenzene | 90 | 92.13 | 90 | 8.13 | 16.444 | 12.807 | P2(1)/c |
| MOF-37 | Zn(NO$_3$)$_2$·6H$_2$O 0.2 mmol H$_2$ NDC 0.2 mmol | DEF Chlorobenzene | 72.38 | 83.16 | 84.33 | 9.952 | 11.576 | 15.556 | P-1 |
| MOF-8 Tb$_2$(ADC) | Tb(NO$_3$)$_3$·5H$_2$O 0.10 mmol H$_2$ ADC 0.20 mmol | DMSO MeOH | 90 | 115.7 | 90 | 19.83 | 9.822 | 19.183 | C2/c |
| MOF-9 Tb$_2$(ADC) | Tb(NO$_3$)$_3$·5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$·5H$_2$O 0.30 mmol H$_2$(BDC) 0.30 mmol | DMF MeOH | 90 | 91.28 | 90 | 17.599 | 19.996 | 10.545 | P21/c |
| MOF-7 | Tb(NO$_3$)$_3$·5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$·6H$_2$O 0.083 mmol 4,4'BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$·6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 Cu$_2$(ATC) | Cu(NO$_3$)$_2$·2.5H$_2$O 0.47 mmol H$_2$ATC 0.22 mmol | H$_2$O | 90 | 93.86 | 90 | 12.987 | 11.22 | 11.336 | C2/c |
| MOF-11 Cu$_2$(ATC) dehydr. | | | 90 | 90 | 90 | 8.4671 | 8.4671 | 14.44 | P42/mmc |
| MOF-14 Cu$_3$(BTB) | Cu(NO$_3$)$_2$·2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$·4H$_2$O 0.24 mmol | H$_2$O NaOH | 90 | 90 | 90 | 13.468 | 13.468 | 13.468 | P(-4)3m |

-continued

| MOF-n | Ingredients molar ratio M + L | Solvents | α | β | γ | a | b | c | Space group |
|---|---|---|---|---|---|---|---|---|---|
| MOF-33 Zn₂(ATB) | H₄ATC 0.10 mmol ZnCl₂ 0.15 mmol H₄ATB 0.02 mmol | H₂O DMF EtOH | 90 | 90 | 90 | 19.561 | 5.255 | 23.404 | Imma |
| MOF-34 Ni(ATC) | Ni(NO₃)₂·6H₂O 0.24 mmol H₄ATC 0.10 mmol | H₂O NaOH | 90 | 90 | 90 | 10.066 | 11.163 | 19.201 | P2₁2₁2₁ |
| MOF-36 Zn₂(MTB) | Zn(NO₃)₂·4H₂O 0.20 mmol H₄MTB 0.04 mmol | H₂O DMF | 90 | 90 | 90 | 15.745 | 16.907 | 18.167 | Pbca |
| MOF-39 Zn₂O(HBTB) | Zn(NO₃)₂·4H₂O 0.27 mmol H₃BTB 0.07 mmol | H₂O DMF EtOH | 90 | 90 | 90 | 17.158 | 21.591 | 25.308 | Pnma |
| NO305 | FeCl₂·4H₂O 5.03 mmol Formic acid 86.90 mmol | DMF | 90 | 90 | 120 | 8.2692 | 8.2692 | 63.566 | R-3c |
| NO306A | FeCl₂·4H₂O 5.03 mmol Formic acid 86.90 mmol | DEF | 90 | 90 | 90 | 9.9364 | 18.374 | 18.374 | Pbcn |
| NO29 MOF-0 similar | Mn(Ac)₂·4H₂O 0.46 mmol H₃BTC 0.69 mmol | DMF | 120 | 90 | 90 | 14.16 | 33.521 | 33.521 | P-1 |
| BPR48 A2 | Zn(NO₃)₂·6H₂O 0.012 mmol H₂BDC 0.012 mmol | DMSO Toluene | 90 | 90 | 90 | 14.5 | 17.04 | 18.02 | Pbca |
| BPR69 B1 | Cd(NO₃)₂·4H₂O 0.0212 mmol H₂BDC 0.0428 mmol | DMSO | 90 | 98.76 | 90 | 14.16 | 15.72 | 17.66 | Cc |
| BPR92 A2 | Co(NO₃)₂·6H₂O 0.018 mmol H₂BDC 0.018 mmol | NMP | 106.3 | 107.63 | 107.2 | 7.5308 | 10.942 | 11.025 | P1 |
| BPR95 C5 | Cd(NO₃)₂·4H₂O 0.012 mmol H₂BDC 0.36 mmol | NMP | 90 | 112.8 | 90 | 14.460 | 11.085 | 15.829 | P2(1)/n |
| CuC₆H₄O₆ | Cu(NO₃)₂·2.5H₂O 0.370 mmol H₂BDC(OH)₂ 0.37 mmol | DMF Chlorobenzene | 90 | 105.29 | 90 | 15.259 | 14.816 | 14.13 | P2(1)/c |
| M(BTC) MOF-0 similar | Co(SO₄)H₂O 0.055 mmol H₃BTC 0.037 mmol | DMF | | as for MOF-0 | | | | | |
| Tb(C₆H₄O₆) | Tb(NO₃)₃·5H₂O 0.370 mmol H₂(C₆H₄O₆) 0.56 mmol | DMF Chlorobenzene | 104.6 | 107.9 | 97.147 | 10.491 | 10.981 | 12.541 | P-1 |
| Zn(C₂O₄) | ZnCl₂ 0.370 mmol Oxalic acid 0.37 mmol | DMF Chlorobenzene | 90 | 120 | 90 | 9.4168 | 9.4168 | 8.464 | P(−3)1m |
| Co(CHO) | Co(NO₃)₂·5H₂O 0.043 mmol Formic acid 1.60 mmol | DMF | 90 | 91.32 | 90 | 11.328 | 10.049 | 14.854 | P2(1)/n |
| Cd(CHO) | Cd(NO₃)₂·4H₂O 0.185 mmol Formic acid 0.185 mmol | DMF | 90 | 120 | 90 | 8.5168 | 8.5168 | 22.674 | R-3c |
| Cu(C₃H₂O₄) | Cu(NO₃)₂·2.5H₂O 0.043 mmol Malonic acid 0.192 mmol | DMF | 90 | 90 | 90 | 8.366 | 8.366 | 11.919 | P43 |

| MOF-n | Ingredients molar ratio M + L | Solvents | α | β | γ | a | b | c | Space group |
|---|---|---|---|---|---|---|---|---|---|
| Zn$_6$(NDC)$_5$ MOF-48 | Zn(NO$_3$)$_2$·6H$_2$O 0.097 mmol 14 NDC 0.069 mmol | DMF Chlorobenzene H$_2$O$_2$ | 90 | 95.902 | 90 | 19.504 | 16.482 | 14.64 | C2/m |
| MOF-47 | Zn(NO$_3$)$_2$·6H$_2$O 0.185 mmol H$_2$(BDC[CH$_3$]$_4$) 0.185 mmol | DMF Chlorobenzene H$_2$O$_2$ | 90 | 92.55 | 90 | 11.303 | 16.029 | 17.535 | P2(1)/c |
| MO25 | Cu(NO$_3$)$_2$·2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$·2.5H$_2$O 0.084 mmol Thiophene- dicarboxylic acid 0.085 mmol | DEF | 90 | 113.6 | 90 | 15.4747 | 14.514 | 14.032 | P2(1)/c |
| C1BDC1 | Cu(NO$_3$)$_2$·2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$·2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_2$BTC 0.033 mmol | DMF EtOH Base added | 90 | 90 | 90 | 26.572 | 26.572 | 26.572 | Fm-3m |
| MOF-j | Co(CH$_3$CO$_2$)$_2$·4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$·6H$_2$O H$_3$(BTC) | Ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF Ethanol | 90 | 102.7 | 90 | 8.3639 | 17.991 | 9.9617 | P2(1)/n |
| Znhex | Zn(NO$_3$)$_2$·6H$_2$O (0.171 mmol) H$_2$BTB (0.114 mmol) | DMF p-Xylene Ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_2$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. Ethanol | 90 | 90 | 120 | 12.535 | 12.535 | 18.479 | P6(2)c |
| AS54-3 | FeBr$_2$ 0.927 BPDC 0.927 mmol | DMF anhydr. n-Propanol | 90 | 109.98 | 90 | 12.019 | 15.286 | 14.399 | C2 |
| AS61-4 | FeBr$_2$ 0.927 mmol m-BDC 0.927 mmol | Pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. Pyridine | 90 | 90 | 90 | 18.3407 | 10.036 | 18.039 | Pca2$_1$ |
| Zn(ADC) | Zn(NO$_3$)$_2$·6H$_2$O 0.37 mmol H$_2$(ADC) 0.36 mmol | DMF Chlorobenzene | 90 | 99.85 | 90 | 16.764 | 9.349 | 9.635 | C2/c |
| MOF-12 Zn$_2$(ATC) | Zn(NO$_3$)$_2$·6H$_2$O 0.30 mmol H$_4$(ATC) 0.15 mmol | Ethanol | 90 | 90 | 90 | 15.745 | 16.907 | 18.167 | Pbca |

-continued

| MOF-n | Ingredients molar ratio M + L | Solvents | α | β | γ | a | b | c | Space group |
|---|---|---|---|---|---|---|---|---|---|
| MOF-20 ZnNDC | Zn(NO₃)₂•6H₂O 0.37 mmol H₂NDC 0.36 mmol | DMF Chlorobenzene | 90 | 92.13 | 90 | 8.13 | 16.444 | 12.807 | P2(1)/c |
| MOF-37 | Zn(NO₃)₂•6H₂O 0.20 mmol H₂NDC 0.20 mmol | DEF Chlorobenzene | 72.38 | 83.16 | 84.33 | 9.952 | 11.576 | 15.556 | P-1 |
| Zn(NDC) (DMSO) | Zn(NO₃)₂•6H₂O H₂NDC | DMSO | 68.08 | 75.33 | 88.31 | 8.631 | 10.207 | 13.114 | P-1 |
| Zn(NDC) | Zn(NO₃)₂• 6H₂O H₂NDC | | 90 | 99.2 | 90 | 19.289 | 17.628 | 15.052 | C2/c |
| Zn(HPDC) | Zn(NO₃)₂•4H₂O 0.23 mmol H₂(HPDC) 0.05 mmol | DMF H₂O | 107.9 | 105.06 | 94.4 | 8.326 | 12.085 | 13.767 | P-1 |
| Co(HPDC) | Co(NO₃)₂•6H₂O 0.21 mmol H₂(HPDC) 0.06 mmol | DMF H₂O/ Ethanol | 90 | 97.69 | 90 | 29.677 | 9.63 | 7.981 | C2/c |
| Zn₃(PDC)2.5 | Zn(NO₃)₂•4H₂O 0.17 mmol H₂(HPDC) 0.05 mmol | DMF/ ⁱClBz H₂O/ TEA | 79.34 | 80.8 | 85.83 | 8.564 | 14.046 | 26.428 | P-1 |
| Cd₂(TPDC)2 | Cd(NO₃)₂•4H₂O 0.06 mmol H₂(HPDC) 0.06 mmol | Methanol/ CHP H₂O | 70.59 | 72.75 | 87.14 | 10.102 | 14.412 | 14.964 | P-1 |
| Tb(PDC)1.5 | Tb(NO₃)₃•5H₂O 0.21 mmol H₂(PDC) 0.034 mmol | DMF H₂O/ Ethanol | 109.8 | 103.61 | 100.14 | 9.829 | 12.11 | 14.628 | P-1 |
| ZnDBP5 | Zn(NO₃)₂•6H₂O 0.05 mmol Dibenzyl phosphate 0.10 mmol | MeOH | 90 | 93.67 | 90 | 9.254 | 10.762 | 27.93 | P2/n |
| Zn₃(BPDC) | ZnBr₂ 0.021 mmol 4,4'BPDC 0.005 mmol | DMF | 90 | 102.76 | 90 | 11.49 | 14.79 | 19.18 | P21/n |
| CdBDC | Cd(NO₃)₂•4H₂O 0.100 mmol H₂(BDC) 0.401 mmol | DMF Na₂SiO₃ (aq) | 90 | 95.85 | 90 | 11.2 | 11.11 | 16.71 | P21/n |
| Cd-mBDC | Cd(NO₃)₂•4H₂O 0.009 mmol H₂(mBDC) 0.018 mmol | DMF MeNH₂ | 90 | 101.1 | 90 | 13.69 | 18.25 | 14.91 | C2/c |
| Zn₄OBNDC | Zn(NO₃)₂•6H₂O 0.041 mmol BNDC | DEF MeNH₂ H₂O₂ | 90 | 90 | 90 | 22.35 | 26.05 | 59.56 | Fmmm |
| Eu(TCA) | Eu(NO₃)₃•6H₂O 0.14 mmol TCA 0.026 mmol | DMF Chlorobenzene | 90 | 90 | 90 | 23.325 | 23.325 | 23.325 | Pm-3n |
| Tb(TCA) | Tb(NO₃)₃•6H₂O 0.069 mmol TCA 0.026 mmol | DMF Chlorobenzene | 90 | 90 | 90 | 23.272 | 23.272 | 23.372 | Pm-3n |
| Formates | Ce(NO₃)₃•6H₂O 0.138 mmol Formic acid 0.43 mmol | H₂O Ethanol | 90 | 90 | 120 | 10.668 | 10.667 | 4.107 | R-3m |
| | FeCl₂•4H₂O 5.03 mmol Formic acid 86.90 mmol | DMF | 90 | 90 | 120 | 8.2692 | 8.2692 | 63.566 | R-3c |
| | FeCl₂•4H₂O 5.03 mmol Formic acid 86.90 mmol | DEF | 90 | 90 | 90 | 9.9364 | 18.374 | 18.374 | Pbcn |
| | FeCl₂•4H₂O 5.03 mmol | DEF | 90 | 90 | 90 | 8.335 | 8.335 | 13.34 | P-31c |

-continued

| MOF-n | Ingredients molar ratio M + L | Solvents | α | β | γ | a | b | c | Space group |
|---|---|---|---|---|---|---|---|---|---|
| NO330 | Formic acid 86.90 mmol FeCl$_2$•4H$_2$O 0.50 mmol | Formamide | 90 | 90 | 90 | 8.7749 | 11.655 | 8.3297 | Pnna |
| NO332 | Formic acid 8.69 mmol FeCl$_2$•4H$_2$O 0.50 mmol | DIP | 90 | 90 | 90 | 10.0313 | 18.808 | 18.355 | Pbcn |
| NO333 | Formic acid 8.69 mmol FeCl$_2$•4H$_2$O 0.50 mmol | DBF | 90 | 90 | 90 | 45.2754 | 23.861 | 12.441 | Cmcm |
| NO335 | Formic acid 8.69 mmol FeCl$_2$•4H$_2$O 0.50 mmol | CHF | 90 | 91.372 | 90 | 11.5964 | 10.187 | 14.945 | P21/n |
| NO336 | Formic acid 8.69 mmol FeCl$_2$•4H$_2$O 0.50 mmol | MFA | 90 | 90 | 90 | 11.7945 | 48.843 | 8.4136 | Pbcm |
| NO13 | Formic acid 8.69 mmol Mn(Ac)$_2$•4H$_2$O 0.46 mmol Benzoic acid 0.92 mmol Bipyridine 0.46 mmol | Ethanol | 90 | 90 | 90 | 18.66 | 11.762 | 9.418 | Pbcn |
| NO29 MOF-0 similar | Mn(Ac)$_2$•4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$•4H$_2$O 0.46 mmol Hfac 0.92 mmol Bipyridine 0.46 mmol | Ether | 90 | 95.32 | 90 | 9.572 | 17.162 | 14.041 | C2/c |
| BPR43G2 | Zn(NO$_3$)$_2$•6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$•6H$_2$O 0.012 mmol H$_2$BDC 0.012 mmol | DMSO Toluene | 90 | 90 | 90 | 14.5 | 17.04 | 18.02 | Pbca |
| BPR49B1 | Zn(NO$_3$)$_2$•6H$_2$O 0.024 mmol H$_2$BDC 0.048 mmol | DMSO Methanol | 90 | 91.172 | 90 | 33.181 | 9.824 | 17.884 | C2/c |
| BPR56E1 | Zn(NO$_3$)$_2$•6H$_2$O 0.012 mmol H$_2$BDC 0.024 mmol | DMSO n-Propanol | 90 | 90.096 | 90 | 14.5873 | 14.153 | 17.183 | P2(1)n |
| BPR68D10 | Zn(NO$_3$)$_2$•6H$_2$O 0.0016 mmol H$_2$BTC 0.0064 mmol | DMSO Benzene | 90 | 95.316 | 90 | 10.0627 | 10.17 | 16.413 | P2(1)/c |
| BPR69B1 | Cd(NO$_3$)$_2$•4H$_2$O 0.0212 mmol H$_2$BDC 0.0428 mmol | DMSO | 90 | 98.76 | 90 | 14.16 | 15.72 | 17.66 | Cc |
| BPR73E4 | Cd(NO$_3$)$_2$•4H$_2$O 0.006 mmol H$_2$BDC 0.003 mmol | DMSO Toluene | 90 | 92.324 | 90 | 8.7231 | 7.0568 | 18.438 | P2(1)/n |
| BPR76D5 | Zn(NO$_3$)$_2$•6H$_2$O 0.0009 mmol H$_2$BzPDC 0.0036 mmol | DMSO | 90 | 104.17 | 90 | 14.4191 | 6.2599 | 7.0611 | Pc |
| BPR80B5 | Cd(NO$_3$)$_2$•4H$_2$O 0.018 mmol H$_2$BDC 0.036 mmol | DMF | 90 | 115.11 | 90 | 28.049 | 9.184 | 17.837 | C2/c |

-continued

| MOF-n | Ingredients molar ratio M + L | Solvents | α | β | γ | a | b | c | Space group |
|---|---|---|---|---|---|---|---|---|---|
| BPR80H5 | Cd(NO$_3$)$_2$•4H$_2$O 0.027 mmol H$_2$BDC 0.027 mmol | DMF | 90 | 119.06 | 90 | 11.4746 | 6.2151 | 17.268 | P2/c |
| BPR82C6 | Cd(NO$_3$)$_2$•4H$_2$O 0.0068 mmol H$_2$BDC 0.202 mmol | DMF | 90 | 90 | 90 | 9.7721 | 21.142 | 27.77 | Fdd2 |
| BPR86C3 | Co(NO$_3$)$_2$•6H$_2$O 0.0025 mmol H$_2$BDC 0.075 mmol | DMF | 90 | 90 | 90 | 18.3449 | 10.031 | 17.983 | Pca2(1) |
| BPR86H6 | Cd(NO$_3$)$_2$•6H$_2$O 0.010 mmol H$_2$BDC 0.010 mmol | DMF | 80.98 | 86.69 | 83.412 | 9.8752 | 10.263 | 15.362 | P-1 |
| BPR95A2 | Co(NO$_3$)$_2$•6H$_2$O Zn(NO$_3$)$_2$•6H$_2$O 0.012 mmol H$_2$BDC 0.012 mmol | NMP NMP | 106.3 90 | 107.63 102.9 | 107.2 90 | 7.5308 7.4502 | 10.942 13.767 | 11.025 12.713 | P1 P2(1)/c |
| CuC$_6$F$_4$O$_4$ | Cu(NO$_3$)$_2$•2.5H$_2$O 0.370 mmol H$_2$BDC(OH)$_2$ 0.37 mmol | DMF Chlorobenzene | 90 | 98.834 | 90 | 10.9675 | 24.43 | 22.553 | P2(1)/n |
| Fe Formic | FeCl$_2$•4H$_2$O 0.370 mmol Formic acid 0.37 mmol | DMF | 90 | 91.543 | 90 | 11.495 | 9.963 | 14.48 | P2(1)/n |
| Mg Formic | Mg(NO$_3$)$_2$•6H$_2$O 0.370 mmol Formic acid 0.37 mmol | DMF | 90 | 91.359 | 90 | 11.383 | 9.932 | 14.656 | P2(1)/n |
| MgC$_6$H$_4$O$_6$ | Mg(NO$_3$)$_2$•6H$_2$O 0.370 mmol H$_2$BDC(OH)$_2$ 0.37 mmol | DMF | 90 | 96.624 | 90 | 17.245 | 9.943 | 9.273 | C2/c |
| ZnC$_2$H$_4$BDC MOF-38 | ZnCl$_2$ 0.44 mmol CBBDC 0.261 mmol | DMF | 90 | 94.714 | 90 | 7.3386 | 16.834 | 12.52 | P2(1)/n |
| MOF-49 | ZnCl$_2$ 0.44 mmol m-BDC 0.261 mmol | DMF CH$_3$CN | 90 | 93.459 | 90 | 13.509 | 11.984 | 27.039 | P2/c |
| MOF-26 | Cu(NO$_3$)$_2$•2.5H$_2$O 0.084 mmol DCPE 0.085 mmol | DMF | 909 | 95.607 | 90 | 20.8797 | 16.017 | 26.176 | P2(1)/n |
| MOF-112 | Cu(NO$_3$)$_2$•2.5H$_2$O 0.084 mmol o-Br-m-BDC 0.085 mmol | DMF Ethanol | 90 | 107.49 | 90 | 29.3241 | 21.297 | 18.069 | C2/c |
| MOF-109 | Cu(NO$_3$)$_2$•2.5H$_2$O 0.084 mmol KDB 0.085 mmol | DMF | 90 | 111.98 | 90 | 23.8801 | 16.834 | 18.389 | P2(1)/c |
| MOF-111 | Cu(NO$_3$)$_2$•2.5H$_2$O 0.084 mmol o-BrBDC 0.085 mmol | DMF Ethanol | 90 | 102.16 | 90 | 10.6767 | 18.781 | 21.052 | C2/c |
| MOF-110 | Cu(NO$_3$)$_2$•2.5H$_2$O 0.084 mmol Thiophene-dicarboxylic acid 0.085 mmol | DMF | 90 | 90 | 120 | 20.0652 | 20.065 | 20.747 | R-3/m |
| MOF-107 | Cu(NO$_3$)$_2$•2.5H$_2$O 0.084 mmol Thiophene-dicarboxylic acid 0.085 mmol | DEF | 104.8 | 97.075 | 95.206 | 11.032 | 18.067 | 18.452 | P-1 |
| MOF-108 | Cu(NO$_3$)$_2$•2.5H$_2$O 0.084 mmol | DBF/ Methanol | 90 | 113.63 | 90 | 15.4747 | 14.514 | 14.032 | C2/c |

-continued

| MOF-n | Ingredients molar ratio M + L | Solvents | α | β | γ | a | b | c | Space group |
|---|---|---|---|---|---|---|---|---|---|
| MOF-102 | Thiophene-dicarboxylic acid 0.085 mmol Cu(NO$_3$)$_2$•2.5H$_2$O 0.084 mmol | DMF | 91.63 | 106.24 | 112.01 | 9.3845 | 10.794 | 10.831 | P-1 |
| Clbdc1 | H$_2$(BDCCl$_2$) 0.085 mmol Cu(NO$_3$)$_2$•2.5H$_2$O 0.084 mmol | DEF | 90 | 105.56 | 90 | 14.911 | 15.622 | 18.413 | P-1 |
| Cu(NMOP) | H$_2$(BDCCl$_2$) 0.085 mmol Cu(NO$_3$)$_2$•2.5H$_2$O 0.084 mmol NBDC 0.085 mmol | DMF | 90 | 102.37 | 90 | 14.9238 | 18.727 | 15.529 | P2(1)/m |
| Tb(BTC) | Tb(NO$_3$)$_3$•5H$_2$O 0.033 mmol H$_3$BTC 0.033 mmol | DMF | 90 | 106.02 | 90 | 18.6986 | 11.368 | 19.721 | |
| Zn$_3$(BTC)$_2$ Honk | ZnCl$_2$ 0.033 mmol H$_3$BTC 0.033 mmol | DMF Ethanol | 90 | 90 | 90 | 26.572 | 26.572 | 26.572 | Fm-3m |
| Zn$_4$O(NDC) | Zn(NO$_3$)$_2$•4H$_2$O 0.066 mmol 14NDC 0.066 mmol | DMF Ethanol | 90 | 90 | 90 | 41.5594 | 18.818 | 17.574 | aba2 |
| CdTDC | Cd(NO$_3$)$_2$•4H$_2$O 0.014 mmol Thiophene 0.040 mmol DABCO 0.020 mmol | DMF H$_2$O | 90 | 90 | 90 | 12.173 | 10.485 | 7.33 | Pmma |
| IRMOF-2 | Zn(NO$_3$)$_2$•4H$_2$O 0.160 mmol o-Br-BDC 0.60 mmol | DEF | 90 | 90 | 90 | 25.772 | 25.772 | 25.772 | Fm-3m |
| IRMOF-3 | Zn(NO$_3$)$_2$•4H$_2$O 0.20 mmol H$_2$N-BDC 0.60 mmol | DEF Ethanol | 90 | 90 | 90 | 25.747 | 25.747 | 25.747 | Fm-3m |
| IRMOF-4 | Zn(NO$_3$)$_2$•4H$_2$O 0.11 mmol [C$_3$H$_7$O]$_2$-BDC 0.48 mmol | DEF | 90 | 90 | 90 | 25.849 | 25.849 | 25.849 | Fm-3m |
| IRMOF-51 | Zn(NO$_3$)$_2$•4H$_2$O 0.13 mmol [C$_3$H$_{11}$O]$_2$-BDC 0.50 mmol | DEF | 90 | 90 | 90 | 12.882 | 12.882 | 12.882 | Pm-3m |
| IRMOF-6 | Zn(NO$_3$)$_2$•4H$_2$O 0.20 mmol [C$_2$H$_4$]-BDC 0.60 mmol | DEF | 90 | 90 | 90 | 25.842 | 25.842 | 25.842 | Fm-3m |
| IRMOF-7 | Zn(NO$_3$)$_2$•4H$_2$O 0.07 mmol 1,4NDC 0.20 mmol | DEF | 90 | 90 | 90 | 12.914 | 12.914 | 12.914 | Pm-3m |
| IRMOF-8 | Zn(NO$_3$)$_2$•4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$•4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$•4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$•4H$_2$O 0.05 mmol HPDC 0.20 mmol | DEF | 90 | 90 | 90 | 24.822 | 24.822 | 56.734 | R-3m |
| IRMOF-12 | Zn(NO$_3$)$_2$•4H$_2$O 0.017 mmol | DEF | 90 | 90 | 90 | 34.281 | 34.281 | 34.281 | Fm-3m |

-continued

| MOF-n | Ingredients molar ratio M + L | Solvents | α | β | γ | a | b | c | Space group |
|---|---|---|---|---|---|---|---|---|---|
| IRMOF-13 | HPDC 0.12 mmol Zn(NO$_3$)$_2$•4H$_2$O 0.048 mmol | DEF | 90 | 90 | 90 | 24.822 | 24.822 | 56.734 | R-3m |
| IRMOF-14 | PDC 0.31 mmol Zn(NO$_3$)$_2$•4H$_2$O 0.17 mmol | DEF | 90 | 90 | 90 | 34.381 | 34.381 | 34.381 | Fm-3m |
| IRMOF-15 | PDC 0.12 mmol Zn(NO$_3$)$_2$•4H$_2$O 0.063 mmol | DEF | 90 | 90 | 90 | 21.459 | 21.459 | 21.459 | Im-3m |
| IRMOF-16 | TPDC 0.025 mmol Zn(NO$_3$)$_2$•4H$_2$O 0.0126 mmol TPDC 0.05 mmol | DEF NMP | 90 | 90 | 90 | 21.49 | 21.49 | 21.49 | Pm-3m |

ADC Acetylenedicarboxylic acid
NDC Naphthalenedicarboxylic acid
BDC Benzenedicarboxylic acid
ATC Adamantanetetracarboxylic acid
BTC Benzenetricarboxylic acid
BTB Benzenetribenzoic acid
MTB Methanetetrabenzoic acid
ATB Adamantanetetrabenzoic acid
ADB Adamantanedibenzoic acid Further MOF are MOF-177 and MOF-178, which are described in the literature.

In a porous metal-organic framework in which Zn or Cu is the metal ion, and the at least bidentate organic compound is terephthalic acid, isophthalic acid, 2,6-naphthalenedicarboxylic acid or 1,3,5-benzenetricarboxylic acid is particularly preferred.

In addition to the conventional method for the preparation of the MOF, as described, for example, in U.S. Pat. No. 5,648,508, these can also be prepared by an electrochemical method. In this context, reference is made to DE-A 103 55 087 and WO-A 2005/049892. The MOFs prepared by this method have particularly good properties in relation to the adsorption and desorption of chemical substances, in particular of gases. They therefore differ from those which are prepared conventionally even when these are formed from the same organic and metal ion components and are therefore to be considered as novel frameworks. In the context of the present invention, electrochemically prepared MOFs are particularly preferred.

Accordingly, the electrochemical preparation relates to a crystalline porous metal-organic framework comprising at least one at least bidentate organic compound which has a coordinate bond to at least one metal ion which is produced in a reaction medium comprising the at least one bidentate organic compound, wherein at least one metal ion is produced by oxidation of at least one anode comprising the corresponding metal.

The term "electrochemical preparation" denotes a preparation process in which the formation of at least one reaction product is associated with the migration of electrical charges or the occurrence of electrical potentials.

The term "at least one metal ion" as used in relation to the electrochemical preparation denotes embodiments according to which at least one ion of a metal or at least one ion of a first metal and at least one ion of at least one second metal differing from the first metal are provided with anodic oxidation.

Accordingly, the electrochemical preparation comprises embodiments in which at least one ion of at least one metal is provided by anodic oxidation and at least one ion of at least one metal is provided via a metal salt, it being possible for the at least one metal in the metal salt and the at least one metal provided via anodic oxidation as a metal ion to be identical or different from one another. With regard to electrochemically prepared MOF, the present invention therefore comprises, for example, an embodiment according to which the reaction medium comprises one or more different salts of a metal and the metal ion which the salt comprises or these salts comprise is additionally provided by anodic oxidation of at least one anode comprising this metal. The reaction medium may also comprise one or more different salts of at least one metal and at least one metal differing from these metals can be provided via anodic oxidation as a metal ion in the reaction medium.

According to a preferred embodiment of the present invention in conjunction with the electrochemical preparation, the at least one metal ion is provided by anodic oxidation of at least one anode comprising this at least one metal, no further metal being provided via a metal salt.

The term "metal" as used in the context of the present invention in conjunction with the electrochemical production of MOFs comprises all elements of the Periodic Table of the Elements which can be provided via anodic oxidation by an electrochemical method in a reaction medium and are capable of forming at least one porous metal-organic framework with at least one at least bidentate organic compound.

Independently of the preparation thereof, the MOF obtained is present in pulverulent or crystalline form. This can be used as such as a sorbent in the method according to the invention, alone or together with other sorbents or further materials. It is preferably employed as bulk material, in particular in a fixed bed. Furthermore, the MOF can be converted into a molding. Preferred methods here are extrusion or tabletting. In the production of moldings, further materials, such as, for example, binders, lubricants or other additives, can be added to the MOF. It is also conceivable for mixtures of MOF and other adsorbents, for example active carbon, to be produced in the form of moldings or separately to give moldings which are then used as mixtures of moldings.

There are substantially no restrictions with regard to the possible geometries of these MOF moldings. For example, inter alia, pellets, such as, for example, disk-like pellets, pills, spheres, granules, extrudates, such as, for example, strands, honeycombs, lattices or hollow bodies, may be mentioned.

In principle, all suitable methods are possible for the production of these moldings. In particular, the following procedures are preferred:

kneading of the framework alone or together with at least one binder and/or at least one pasting agent and/or at least one template compound to give a mixture; moldings of the resulting mixture by means of at least one suitable method, such as, for example, extrusion; optionally washing and/or drying and/or calcination of the extrudate; optionally compounding.

application of the framework to at least one optionally porous carrier material. The material obtained can then be further processed by the method described above to give a molding.

application of the framework to at least one optionally porous substrate.

Kneading and molding can be effected by any suitable method, as described, for example, in Ullmanns Enzyklopädie der Technischen Chemie, 4th Edition, Volume 2, page 313 et seq. (1972), the content of which is hereby fully incorporated by reference in the context of the present Application.

For example, the kneading and/or molding can preferably be effected by means of a piston press, roll press in the presence or absence of at least one binder material, compounding, pelleting, tabletting, extrusion, coextrusion, foaming, spinning, coating, granulation, preferably spray granulation, spraying, spray-drying or a combination of two or more of these methods.

Pellets and/or tablets are very particularly produced.

The kneading and/or molding can be effected at elevated temperatures, such as, for example, in the range from room temperature to 300° C., and/or at elevated pressure, such as, for example, in the range from atmospheric pressure to a few hundred bar, and/or in an inert gas atmosphere, such as, for example, in the presence of at least one noble gas, nitrogen or a mixture of two or more thereof.

The kneading and/or molding is carried out according to a further embodiment with addition of at least one binder, it being possible in principle to use as the binder any chemical compound which ensures the desired viscosity of the material to be kneaded and or to be molded for the kneading and/or molding. Accordingly, in the context of the present invention, binders may be both viscosity-increasing and viscosity-reducing.

For example, alumina or alumina-comprising binders, as described, for example, in WO 94/29408, silica, as described, for example, in EP 0 592 050 A1, mixtures of silica and alumina, as described, for example, in WO 94/13584, clay minerals, as described, for example, in JP 03-037156 A, for example montmorillonite, kaolin, bentonite, hallosite, dickite, nacrite and anauxite, alkoxysilanes, as described, for example, in EP 0 102 544 B1, for example tetraalkoxysilanes, such as, for example, tetramethoxysilane, tetraethoxysilane, tetrapropoxysilane or tetrabutoxysilane, or, for example, trialkoxysilanes, such as, for example, trimethoxysilane, triethoxysilane, tripropoxysilane or tributoxysilane, alkoxytitanates, for example tetraalkoxytitanates, such as, for example, tetramethoxytitanate, tetraethoxytitanate, tetrapropoxytitanate or tetrabutoxytitanate, or, for example, trialkoxytitanates, such as, for example, trimethoxytitanate, triethoxytitanate, tripropoxytitanate or tributoxytitanate, alkoxyzirconates, such as, for example, tetraalkoxyzirconates, such as, for example, tetramethoxyzirconate, tetraethoxyzirconate, tetrapropoxyzirconate or tetrabutoxyzirconate, or, for example, trialkoxyzirconates, such as, for example, trimethoxyzirconate, triethoxyzirconate, tripropoxyzirconate or tributoxyzirconate, silica sols, amphiphilic substances and/or graphites may be mentioned as binders which are preferred inter alia. Graphite is particularly preferred.

An organic compound and/or a hydrophilic polymer, such as, for example, cellulose, or a cellulose derivative, such as, for example, methylcellulose, and/or a polyacrylate and/or a polymethacrylate and/or a polyvinyl alcohol and/or a polyvinylpyrrolidone and/or a polyisobutene and/or a polytetrahydrofuran can, for example, also be used as a viscosity-increasing compound, if appropriate in addition to the abovementioned compounds.

Inter alia, water or at least one alcohol, such as, for example, a monoalcohol having 1 to 4 carbon atoms, such as, for example, methanol, ethanol, n-propanol, isopropanol, 1-butanol, 2-butanol, 2-methyl-1-propanol or 2-methyl-2-propanol, or a mixture of water and at least one of said alcohols or a polyhydric alcohol, such as, for example, a glycol, preferably a water-miscible polyhydric alcohol, alone or as a mixture with water and/or at least one of said monohydric alcohols, may preferably be used as the pasting agent.

Further additives which may be used for the kneading and/or molding are, inter alia, amines or amine derivatives, such as, for example, tetraalkylammonium compounds or aminoalcohols, and carbonate-comprising compounds, such as, for example, calcium carbonate. Such further additives are described, for example, in EP 0 389 041 A1, EP 0 200 260 A1 or WO 95/19222.

The sequence of the additives, such as template compound, binder, pasting agent and viscosity-increasing substance, in the molding and kneading is in principle not critical.

According to a further preferred embodiment, the molding obtained by kneading and/or molding is subjected to at least one drying operation, which is generally carried out at a temperature in the range from 25 to 300° C., preferably in the range from 50 to 300° C. and particularly preferably in the range from 100 to 300° C. It is also possible to dry under reduced pressure or under an inert gas atmosphere or by spray-drying.

According to a particularly preferred embodiment, at least one of the compounds added as additives is at least partly removed from the molding during this drying process.

The invention furthermore relates to the use of a porous metal-organic framework which comprises at least one at least bidentate organic compound having a coordinate bond to at least one metal ion for the absorption of liquids.

The present invention is to be explained in more detail with reference to the following example.

EXAMPLES

Example 1

A stirring bar and an MOF powder are introduced into a jar having a snap-on lid. Toluene is added dropwise to this jar until the powder agglomerates. The amount of toluene which was taken up until agglomeration occurred is listed in the table below.

The Cu-MOF and IR-MOF-8 prepared by an electrochemical method using benzene-1,3,5-tricarboxylic acid (1,3,5-BTC) are used as MOF materials. Cu-MOF can be prepared by an electrochemical method as stated in WO-A 2005/049892. IR-MOF-8 is described in WO-A 02/088148.

|  | Amount of MOF (g) | Amount of toluene (g) | Absorption of toluene (%) |
|---|---|---|---|
| Cu-MOF | 0.530 | 0.764 | 144 |
|  | 0.572 | 0.818 | 143 |
|  | 0.528 | 0.768 | 145 |
| IR-MOF-8 | 0.564 | 0.710 | 125 |
|  | 0.580 | 0.758 | 130 |
|  | 0.433 | 0.525 | 121 |

Example 2

Water Uptake According to Fisher-Mottlau

In analogy to example 1 water is added dropwise to an Al-MOF (terephthalic acid) and Cu-isophthalic acid MOF material prepared by an electrochemical method. The amount of water which was taken up until agglomeration occurred is listed in the table below.

|  | g water/g MOF powder | g water/ml powder |
|---|---|---|
| Al-MOF | 1.21 | 0.295 |
| Cu-Isophth. MOF | 1.37 | 0.213 |

We claim:

1. A method for the absorption of liquids, which comprises bringing the liquid into contact with at least one sorbent comprising a porous metal-organic framework, the framework taking up the liquid and comprising at least one at least bidentate organic compound having a coordinate bond to at least one metal ion by pouring the at least one sorbent onto a pool of the liquid.

2. The method according to claim 1, the liquid being liquid waste.

3. The method according to claim 1, the liquid being a disinfectant, an odoriferous substance, an inorganic or organic solvent, fuel, or an oil.

4. The method according to claim 1, the liquid comprising optionally halogenated aliphatic or aromatic, cyclic or acyclic hydrocarbon or a mixture thereof.

5. The method according to claim 1, the liquid comprising acetone, acetonitrile, aniline, anisole, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water or a mixture thereof.

6. The method according to claim 1, the volume of the porous metal-organic framework not changing as a result of the absorption of the liquid.

7. The method according to claim 1, the porous metal-organic framework having at least one of the following properties:
   a) specific surface area>5 $m^2/g$ (according to DIN 66131);
   b) pore size of the crystalline MOF from 0.2 nm to 30 nm;
   c) at least half the pore volume is formed by pores having a pore diameter of up to 1000 nm.

8. The method according to claim 1, the porous metal-organic framework comprising Zn or Cu as the metal ion and the at least bidentate organic compound being isophthalic acid, 2,6-naphthalenedicarboxylic acid, terephthalic acid or 1,3,5-benzenetricarboxylic acid.

9. The method according to claim 1, the porous metal-organic framework having been prepared by an electrochemical method.

* * * * *